INVENTORS.
ALLEN G. BAKER and
ROBERT C. INGRAHAM

BY David M. Keay
AGENT.

INVENTORS.
ALLEN G. BAKER and
ROBERT C. INGRAHAM
BY David M. Keay
AGENT.

INVENTORS.
ALLEN G. BAKER and
ROBERT C. INGRAHAM

BY David M. Keay
AGENT.

INVENTORS.
ALLEN G. BAKER and
ROBERT C. INGRAHAM

BY David M. Keay
AGENT.

INVENTORS.
ALLEN G. BAKER and
ROBERT C. INGRAHAM

BY David M. Keay
AGENT.

INVENTORS.
ALLEN G. BAKER and
ROBERT C. INGRAHAM

BY David M. Keay
AGENT.

INVENTORS.
ALLEN G. BAKER and
ROBERT C. INGRAHAM

BY David M. Keay
AGENT.

INVENTORS.
ALLEN G. BAKER and
ROBERT C. INGRAHAM

BY David M. Keay
AGENT.

INVENTORS.
ALLEN G. BAKER and
ROBERT C. INGRAHAM

BY David M. Keay
AGENT.

United States Patent Office 3,421,985
Patented Jan. 14, 1969

3,421,985

METHOD OF PRODUCING SEMICONDUCTOR DEVICES HAVING CONNECTING LEADS ATTACHED THERETO

Allen G. Baker, Waltham, and Robert C. Ingraham, Topsfield, Mass., assignors to Sylvania Electric Products Inc., a corporation of Delaware Filed Oct. 19, 1965, Ser. No. 498,039
U.S. Cl. 204—15 8 Claims
Int. Cl. C23b *5/50;* C23b *7/68*

Figures 1, 1A:
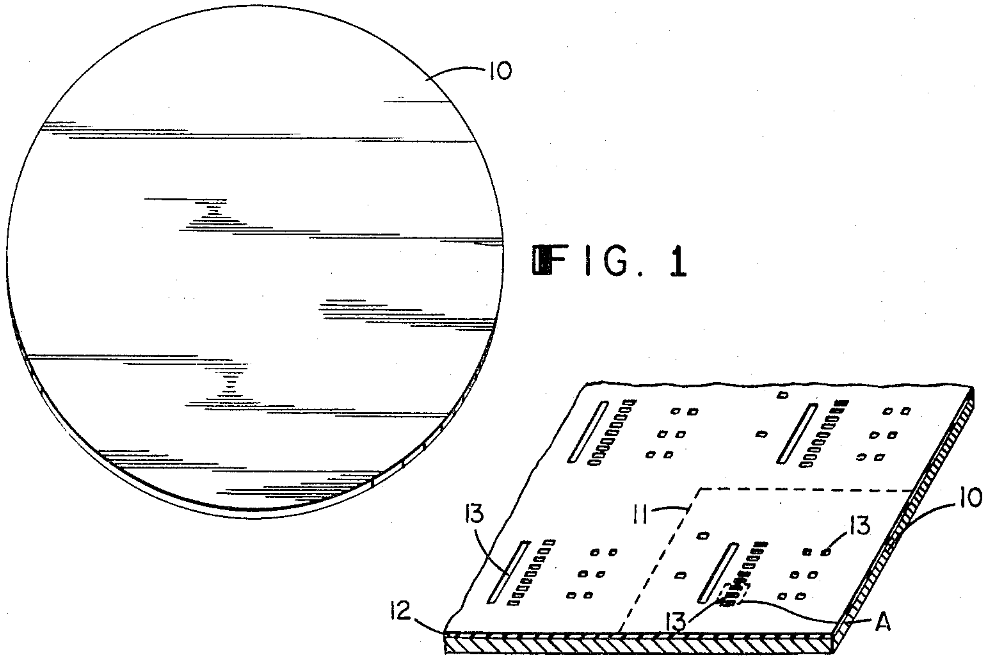

This invention relates to semiconductor electrical translating devices. More particularly, it is concerned with methods of producing semiconductor devices having conductive leads affixed to the bodies of semiconductor material in which the electrically active elements of the devices are fabricated.

Semiconductor devices of the type formed by diffusion of conductivity type imparting materials into a body of semiconductor material typically have been mounted on a suitable header or support and the electrically active regions of the body have been connected to the header leads by small contact wires. The contact wires were attached to the header leads and to the ohmic contacts on the body of semiconductor material by known techniques of thermal compression bonding or welding. This method of mounting bodies of semiconductor material and connecting to external leads has been employed in the production of individual components and also in the production of integrated circuit networks having several components incorporated in a single body of semiconductor material. Interconnections between the components of an integrated circuit network have been formed by thin films of metal, such as aluminum, which adhere to the non-conductive protective coating on the surface of the semiconductor body.

Recently there has been developed a method of forming relatively heavy supporting leads which adhere to the body of semiconductor material and are suitable for providing connections to external leads and also interconnections between components of an integrated circuit network. The leads are fabricated on the surface of a wafer of semiconductor material and portions of the wafer are removed to leave a body of semiconductor material containing the active elements of the device with portions of the leads adhering to the surface of the body and other portions extending outward from the body. The outwardly extending portions may be directly connected, as by welding, to the header leads.

In the fabrication of integrated circuit networks semiconductor material between individual components or groups of components may be removed subsequent to formation of the leads to provide a plurality of bodies of semiconductor material supported in fixed relationship with respect to each other by the heavy supporting leads. The components within each body are thus electrically isolated from those within every other body.

The supporting leads are formed on a wafer of semiconductor material after the active regions have been produced by diffusion and the surface of the wafer has been covered with an adherent non-conductive protective coating having openings exposing areas at which electrical contact is to be made by the leads. The leads are fabricated in a series of steps employing various materials in succession in order to delineate the pattern of the leads, provide for adherence of the leads to the wafer, and build up the leads to satisfactory thickness. An electroplating technique is employed to build up the leads. The regions being plated are electrically connected to each other by conductive material on the surface of the wafer. This conductive material is covered with a nonconductive coating during the plating process and is removed from the wafer subsequent to the plating step. The materials and procedures employed at each step in the process must be compatible with those employed in preceding steps. Because of these requirements there are many problems in fabricating supporting leads. Certain processes are particularly difficult to control. For example, removal from the wafer surface of the conductive material which provides electrical connections during plating is commonly achieved by a combination of sputtering away and etching techniques which may cause deterioration of the completed leads.

It is an object of the present invention, therefore, to provide an improved method for producing semiconductor devices.

It is another object of the invention to provide an improved method for forming supporting leads on a body of semiconductor material.

It is also an object of the invention to provide a method for electroplating supporting leads on a body of semiconductor material in which temporary contacts provided between the regions being plated are readily removed subsequent to completion of the leads without damage to the leads.

Briefly, in accordance with the foregoing objects of the invention supporting leads are formed on a surface of a body of semiconductor material which is covered with an adherent non-conductive coating having openings exposing underlying regions of the semiconductor body. Conductive contacts make ohmic connection to the semiconductor material at each opening in the non-conductive coating.

A first layer of material which, as will be apparent, does not constitute a part of the finished device is placed on predetermined portions of the surface of the non-conductive coating leaving exposed other portions of the surface of the coating and at least portions of the conductive contacts in a pattern delineating the leads to be formed. A layer of conductive material is then placed on the exposed portions of the surface of the non-conductive coating and the conductive contacts and also on the first layer of material.

The assembly is subjected to etching material which is capable of dissolving the material of the first layer but not the other materials of the assembly thereby removing the material of the first layer and also the portion of the layer of conductive material overlying the first layer. A plurality of segments of conductive material remain on the aforementioned portions of the surface of the non-conductive coating and the conductive contacts in a pattern delineating the leads to be formed.

A layer of a second conductive material and an overlying non-conductive masking material are placed on exposed areas of the surface of the adherent non-conductive coating in such a way as to establish electrical contact between all the segments of conductive material remaining on the other portions of the surface and the conductive contacts. A layer of a conductive material is then electroplated onto the exposed conductive surfaces of the assembly to form relatively thick conductive lead members overlying the segments of conductive material which delineate the pattern of the leads. Subsequent to the plating step the non-conductive material is removed. Then the second conductive material is removed by subjecting the assembly to etching material which is capable of dissolving the second conductive material but not the other materials of the assembly.

Figure 1B:
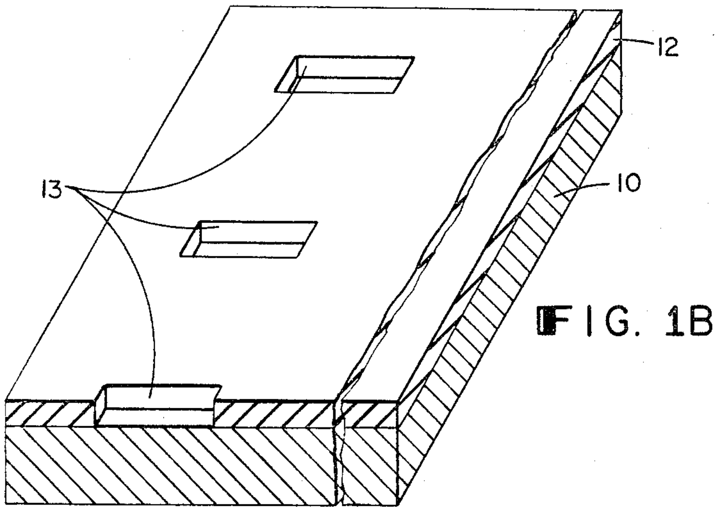
Figure 16:
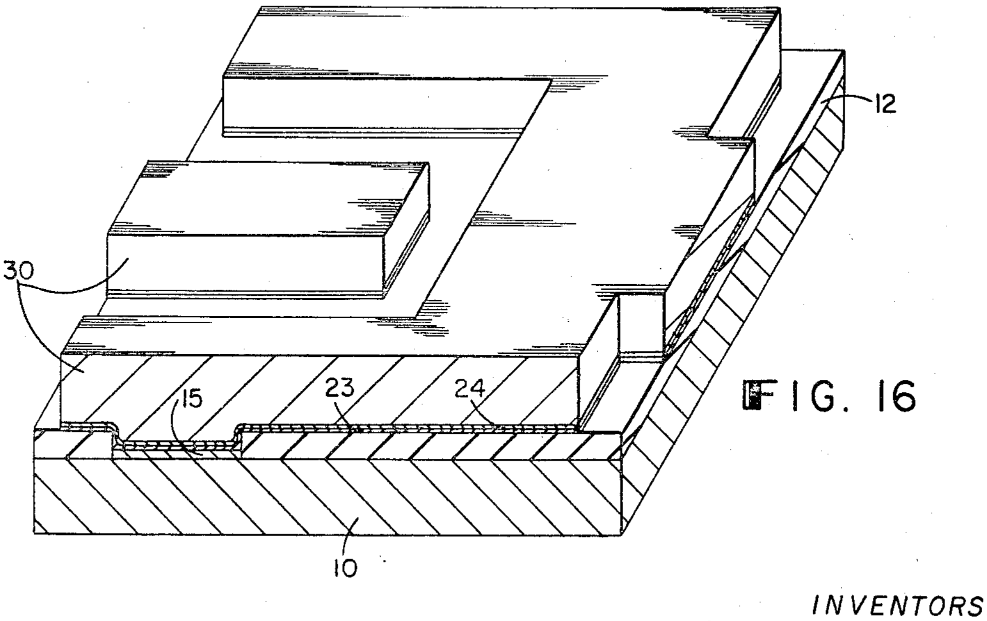
Figure 17:
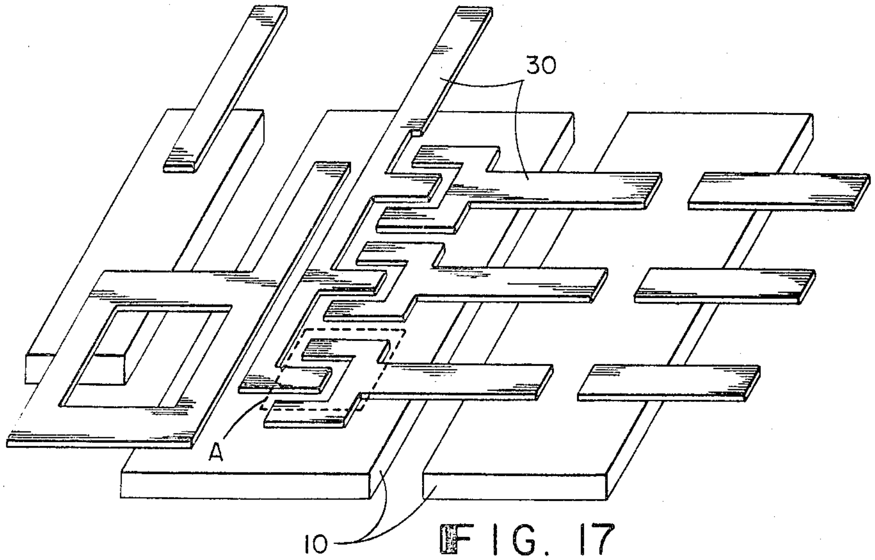

Additional objects, features, and advantages of the method of the invention will be apparent from the following detailed discussion and the accompanying drawings wherein:

FIG. 1 is a perspective view of a wafer of semiconductor material within which the components of a plurality of integrated circuits have been formed by diffusion and onto which the supporting leads are to be formed in accordance with the method of the invention, FIG. 1A is a perspective view in cross-section of a fragment of the wafer of FIG. 1 showing the coating of non-conductive material and the openings in the coating to which contacts are to be made by supporting leads, FIG. 1B is a perspective view in cross-section of the portion of the fragment of FIG. 1A delineated by the dashed lines "A" in FIG. 1A, FIGS. 2 through 16 are perspective views in cross-section of the portion of the wafer shown in FIG. 1B illustrating various stages in the fabrication of supporting leads in accordance with the invention, and FIG. 17 is a perspective view of an integrated circuit network having supporting leads fabricated in accordance with the invention.

Because of the extremely small size of various portions of the elements illustrated in the drawings, some of the dimensions of many of the elements have been exaggerated with respect to other dimensions. It is believed that greater clarity of presentation is thereby obtained despite consequent distortion of elements in relation to their actual physical appearance.

In the fabrication of semiconductor devices of the diffused type either as individual components or as a group of components in the form of an integrated circuit network hundreds of devices are produced at one time in a wafer of semiconductor material of relatively large surface area. At a certain stage in the production of the devices the wafer is broken up into individual components or individual circuit networks for attaching or mounting in a suitable enclosure.

A wafer of silicon 10 having a plurality of identical integrated circuit networks each including several components formed by diffusion of conductivity type imparting materials into the wafer is shown in FIG. 1, and an enlarged view of a fragment of the wafer is shown in FIG. 1A. A section of the wafer containing the components of a single integrated circuit network is indicated by the broken line 11 in FIG. 1A. The upper flat major surface of the wafer is covered by silicon oxide 12 which forms an adherent non-conductive protective coating over the surface. Openings 13 in the oxide expose areas of the surface at regions of the wafer to which electrical connections are to be made. The wafer as illustrated is produced by the well known processes of diffusing conductivity type imparting materials through openings in oxide coatings which are defined by photo-resist masking and etching techniques.

FIG. 1B shows a small portion of the silicon slice indicated by the dashed lines label A in FIG. 1A. This same portion is shown in FIGS. 2 through 16 during various stages of the method of fabricating supporting leads according to the invention.

Figures 2, 3:
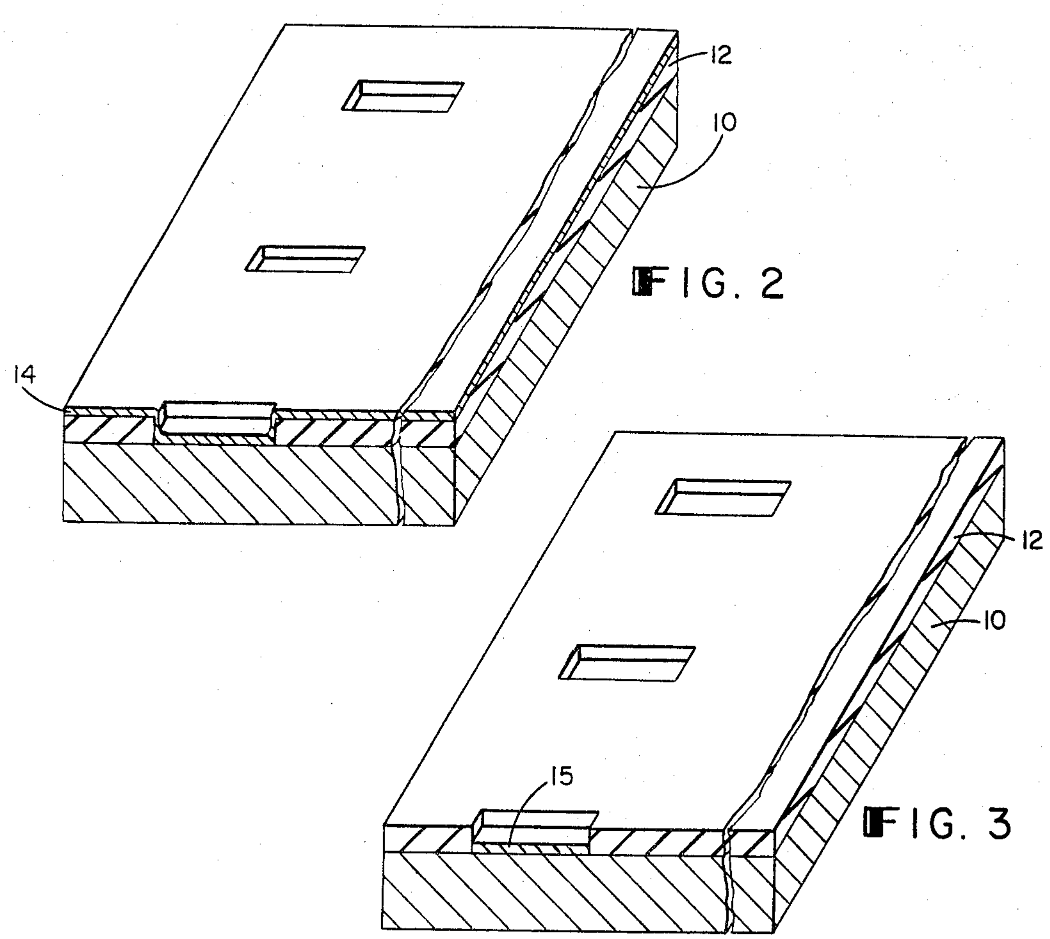

As shown in FIG. 1B the surface of the silicon wafer 10 is covered with an adherent layer of silicon oxide 12 having openings 13 exposing surface areas of the underlying silicon. A conductive contact is formed in each of the openings to make ohmic connection to the exposed silicon. The ohmic contacts may be formed by placing the silicon wafer in a suitable apparatus and sputtering platinum onto the upper surface. As shown in FIG. 2 a layer of platinum 14 approximately 225 angstrom units thick is deposited on the surface of the oxide coating 12 and on the exposed areas of the silicon. The temperature of the silicon wafer is raised to approximately 700° C. without removing it from the sputtering apparatus causing the platinum within the openings to combine with the silicon and form platinum silicide. The platinum in contact with the oxide is not affected. The procedure of sputtering on a layer of platinum approximately 225 angstrom units thick and heating to 700° C. is repeated twice.

The wafer is immersed in a standard aqua regia solution on 1 part nitric acid and 3 parts hydrochloric acid for a period of about 6 minutes. The aqua regia solution dissolves the platinum, but does not attack the silicon, the silicon oxide, or the platinum silicide. The platinum silicide adheres to the silicon and forms an ohmic conductive contact 15 as shown in FIG. 3.

Figure 4:
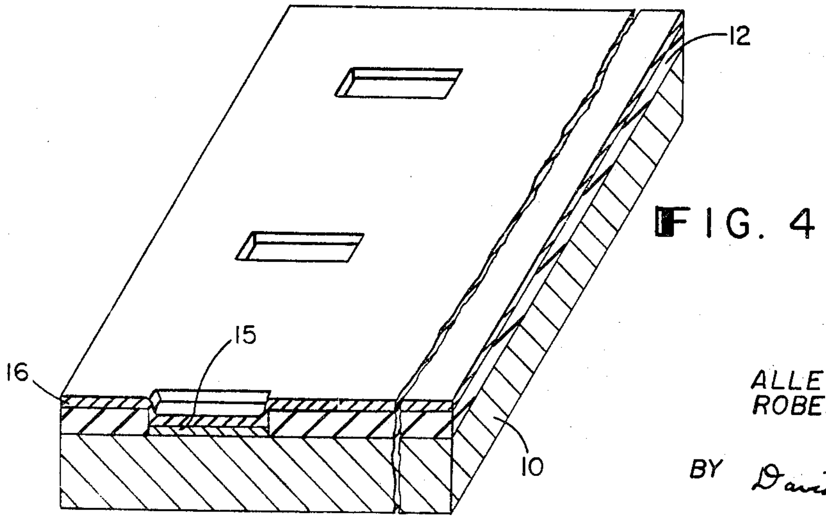

Next, as shown in FIG. 4, a layer of material 16 is deposited over the surface of the silicon oxide and the platinum silicide contacts. Since, as will be apparent, the layer will not constitute a part of the finished device it may be designated a temporary layer. The layer is formed by placing the wafer in a standard vacuum evaporation apparatus and vapor depositing copper in a layer approximately 8,000 angstrom units thick. In order to improve the adherence of the copper to the wafer the temporary layer may include a thin film of manganese, Nichrome, or aluminum approximately 200 angstrom units thick which is deposited prior to deposition of the copper.

Figure 5:
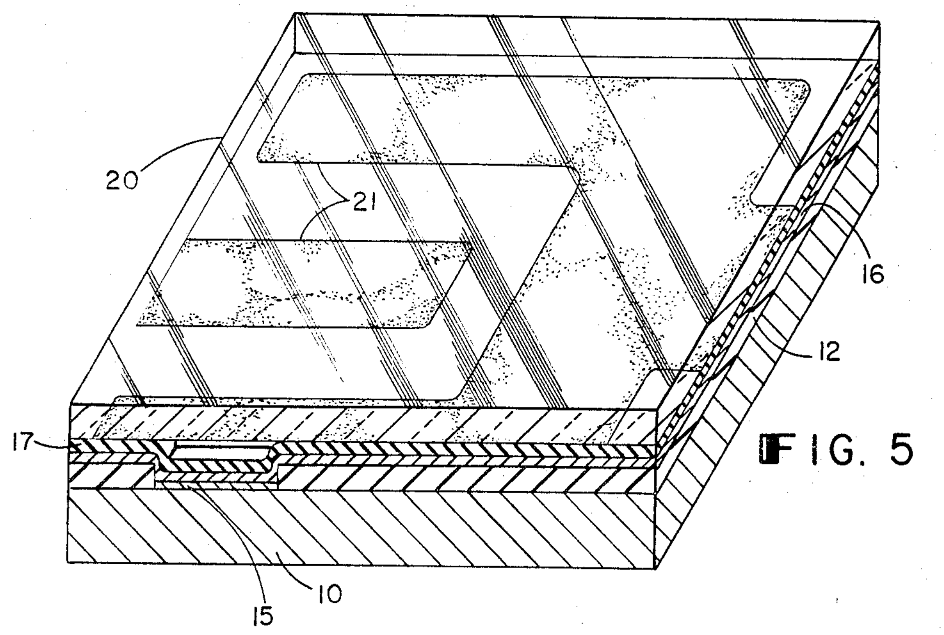

A layer 17 of photosensitive resistant material of the type employed in known masking and etching techniques for forming openings in silicon oxide is placed over the surface of the copper layer 16 as shown in FIG. 5. Any of the well known photosensitive polymerizable resistant materials known in the art may be employed. The resistant material is applied as by spinning on or by spraying.

The layer of resistant material is dried and then selectively exposed to ultraviolet light through a mask 20. The mask is of a transparent material, typically glass, and portions 21 of one surface are rendered opaque in a particular predetermined pattern conforming to the pattern of the leads to be produced. The mask is fabricated by employing known photolithographic techniques which enable the opaque areas and the spaces between them to be defined with a high degree of precision.

Figure 6:
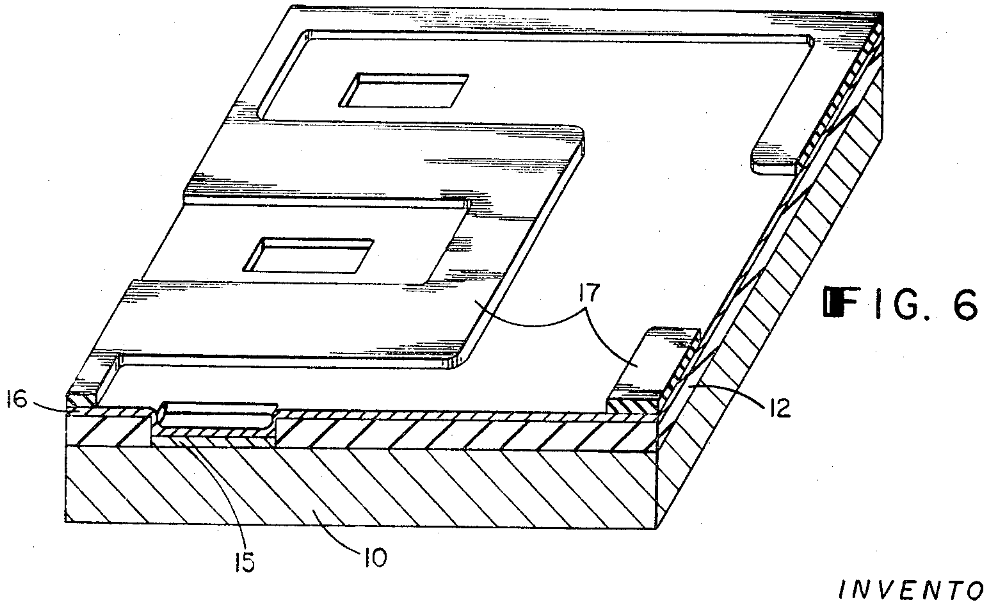

The mask is properly aligned with the silicon wafer by observation of the pattern of depressions in the surface of the resistant material caused by the underlying openings 13 in the silicon oxide. The masked wafer is subjected to ultraviolet light polymerizing the portions of the resistant material underlying the transparent regions of the mask. Then the mask is removed, and the wafer is rinsed in a suitable developing solution which washes away the portions of the resistant material which were under the opaque regions of the mask and thus not exposed to the ultraviolet light. The assembly may then be baked to further polymerize and harden the resistant material. The resulting assembly is illustrated in FIG. 6.

Figure 7:
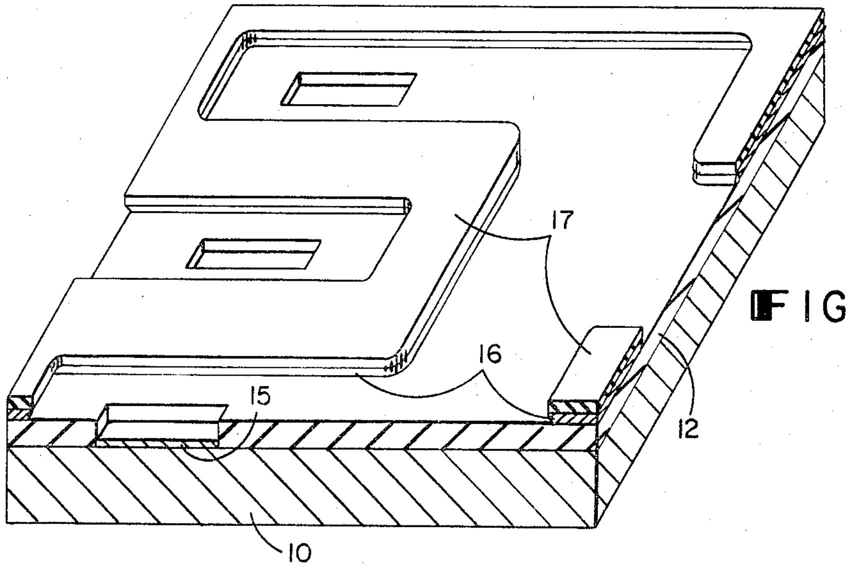
Figure 8:
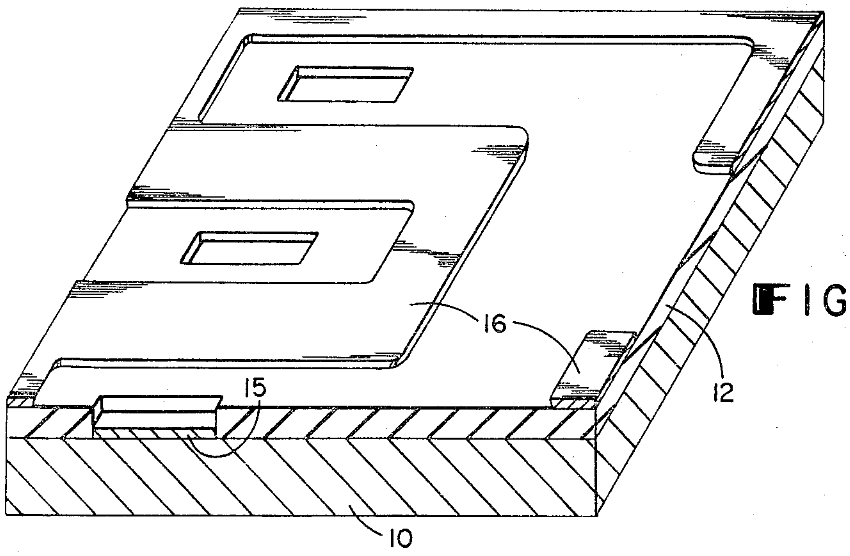

Then, the assembly is treated to remove the portions of the temporary layer 16 not protected by the resistant material 17. The wafer is immersed in an aqueous solution of 20 grams of ferric nitrate per 100 milliliters of solution for a period of about ½ minute. This etching solution dissolves copper, and also manganese and Nichrome, but does not attack other materials of the assembly. Thus, if the temporary layer 16 is constituted of copper, or of copper and a film of either manganese or Nichrome, the exposed portions of the temporary layer not protected from the etching solution by the resistant material 17 are removed as shown in FIG. 7. If the temporary layer 16 is constituted of copper and an underlying film of aluminum, only the copper is removed by the ferric nitrate solution, and the etching procedure is accomplished in two stages. After removal of the copper the exposed aluminum is etched away by spraying the assembly with an aqueous etching solution of 500 grams of C.P. grade sodium hydroxide per 1,000 milliliters of solution for a period of about 2 minutes. This etching solution dissolves aluminum but not copper or other materials of the assembly.

Following the etching treatment and rinsing of the assembly the resistant material is removed by dissolving in a suitable solvent. As can be seen from the portion of the wafer shown in FIG. 8 the copper layer 16 remains over certain predetermined portions of the oxide, and its edges border other portions of the oxide coating and conductive contacts 15 which are exposed in a pattern delineating the leads to be formed.

Figure 9:
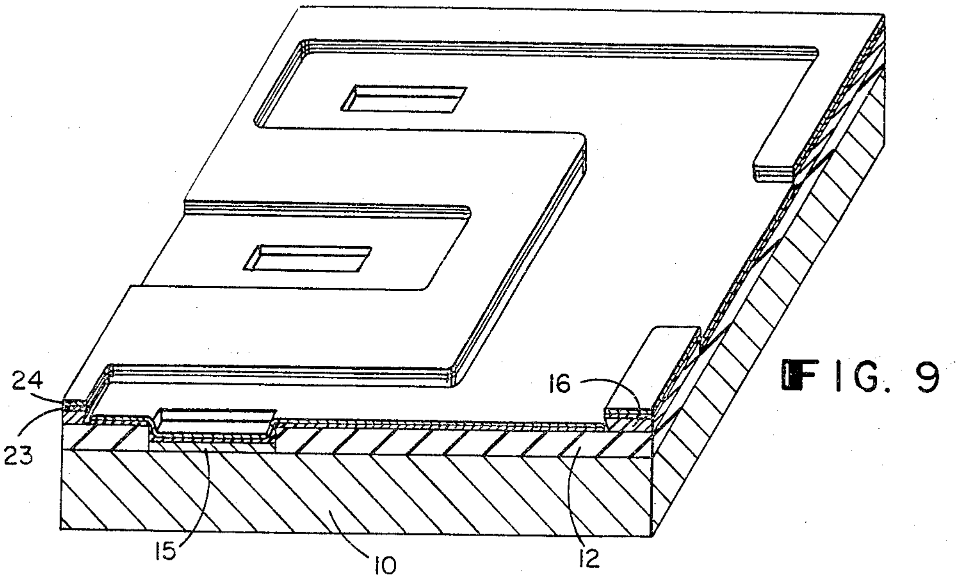

Next, the wafer is placed in a suitable apparatus and a layer of titanium 23 approximately 1500 angstrom units thick is sputtered or evaporated onto the slice as shown in FIG. 9. Titanium deposits on the exposed surface areas of the oxide coating 12 and on the platinum silicide contacts 15. Titanium also deposits on the upper surface of the layer of copper 16. Following deposition of the titanium a layer of platinum 24 approximately 3500 angstrom units thick is sputtered onto the wafer. The platinum deposits on the surface of the titanium layer.

The assembly is then immersed in an aqueous ferric nitrate solution of the same concentration as that employed previously heated to a temperature of about 50° C. The assembly may be ultrasonically agitated while it is immersed in the solution. The ferric nitrate solution dissolves copper and also manganese and Nichrome but does not attack titanium, platinum, aluminum, or other materials of the assembly. The etching solution attacks the copper layer at the exposed edges. Titanium and platinum may cover some portions of the edges of the copper layer. However, by virtue of some undercutting at the edges of the copper layer during the first treatment in ferric nitrate and the copper layer being thicker than the titanium and platinum layers, the edges remain exposed sufficiently to provide adequate surface area for the etching solution to attack the copper. The assembly is immersed in the etching solution for about 5 minutes to dissolve the copper.

The assembly is removed from the ferric nitrate bath and the titanium and platinum which was deposited on the copper layer is readily separated from the assembly if it has not already been separated by agitation during treatment in the etching solution. These materials may be removed by contacting the exposed upper surface of the assembly with a sheet of flexible material having an adhesive coating on one surface. When the sheet is lifted, the undermined platinum and titanium adhere to the adhesive and are peeled from the assembly. The portions of the titanium and platinum layers having titanium adherent to the silicon oxide coating are not disturbed.

The assembly is replaced in the ferric nitrate solution for a period of 1 to 5 minutes to remove any copper which might have remained. If the temporary layer 16 includes a film of manganese or Nichrome, this film is also dissolved by the ferric nitrate solution. If the temporary layer includes a layer of aluminum, then subsequent to the last-mentioned treatment in the ferric nitrate solution, the assembly is sprayed for about 2 minutes with a sodium hydroxide solution of the same concentration as that employed previously in order to dissolve the aluminum film.

Figure 10:
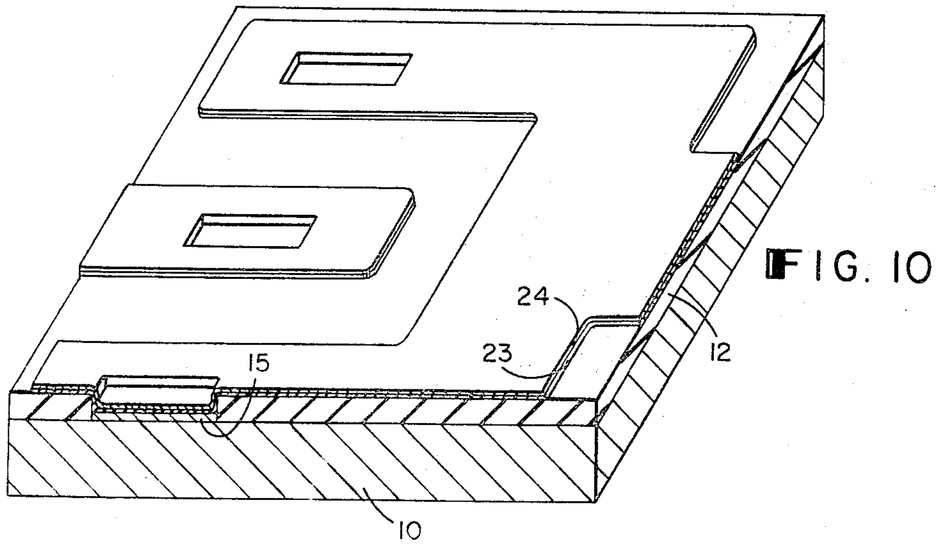

As illustrated in FIG. 10 the plurality of separate segments 23–24 of platinum and underlying titanium which remain are in the pattern of the supporting leads to be formed. They overlie and make physical and electrical connection to the platinum silicide ohmic contacts 15. Each segment extends between two or more of the ohmic contacts delineating an interconnection between the components of an integrated circuit network, or extends from an ohmic contact delineating a lead for making connection externally of the circuit network.

Figure 11:
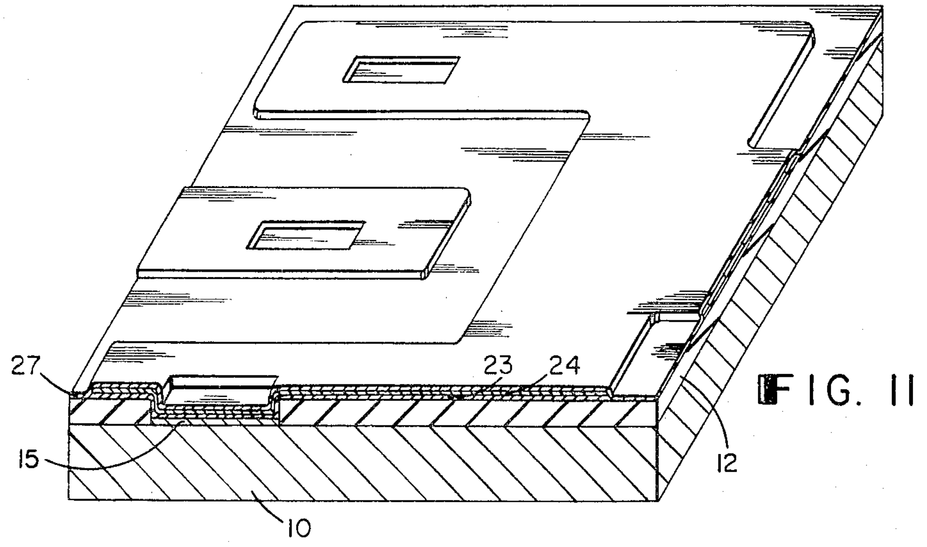
Figure 12:
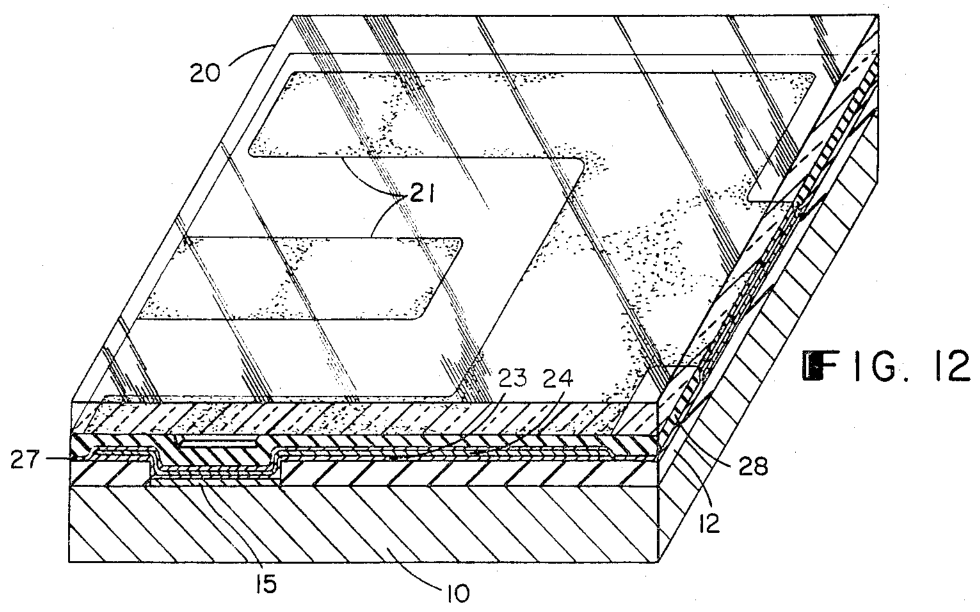

The assembly is placed in a suitable evaporation apparatus and a layer of aluminum 27 approximately 2500 angstrom units thick is deposited on the surface of the assembly covering the platinum layer and the exposed surface of the silicon oxide coating as illustrated in FIG. 11. A non-conductive photosensitive resistant material 28 which may be of the same type as that previously employed is placed on the surface of the aluminum layer as shown in FIG. 12. The mask 20 previously employed is placed over the resistant coating and positioned by noting the depressions in the coating so that the opaque regions 21 of the mask are generally aligned with the platinum and titanium segments 23–24.

Figure 13:
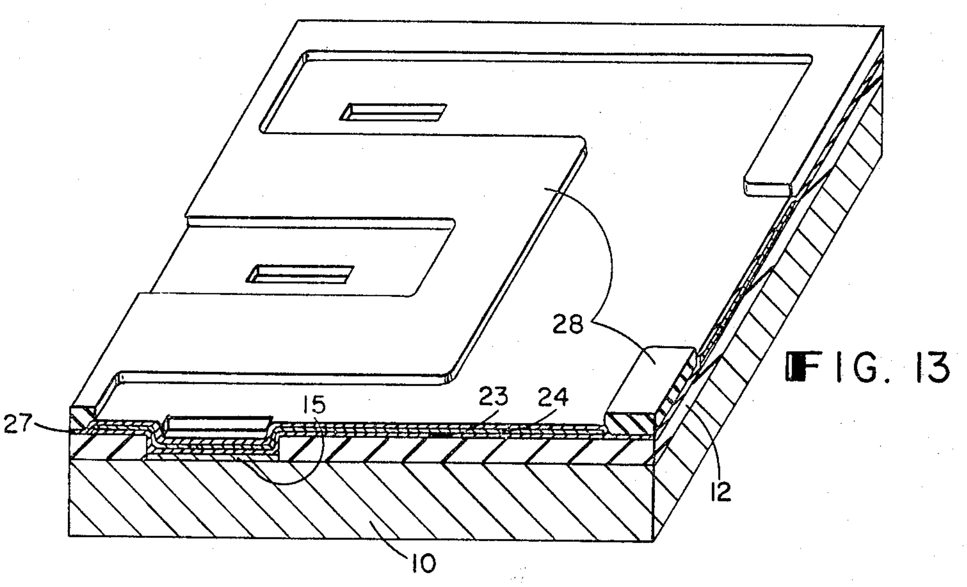

The masked wafer is subjected to ultraviolet light polymerizing the photosensitive resistant material underlying the transparent regions of the mask 20. The mask is removed and the assembly is rinsed in a developing solution to wash away the resistant material which was not exposed to light. The result is illustrated in FIG. 13.

Figure 14:
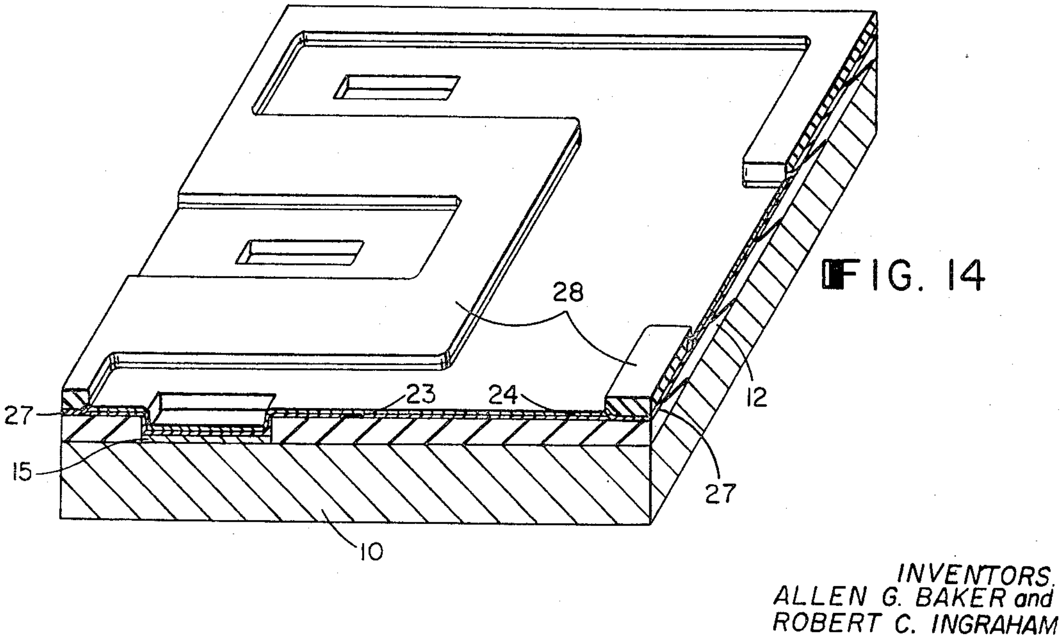

The exposed aluminum is then etched away as by spraying the assembly for a period of about 2 minutes with an aqueous solution of sodium hydroxide having the same concentration as that employed previously. The etching solution dissolves aluminum but does not attack the resistant material or the platinum. The exposed aluminum is thus removed while the aluminum 27 protected by the overlying resistant material 28 is not disturbed. The resulting assembly is shown in FIG. 14. Since absolutely perfect alignment of the mask with respect to the wafer is virtually impossible, there is some overlapping of the titanium and platinum segments 23–24 and the remaining aluminum layer 27, and thus the aluminum layer is in contact with at least a portion of each titanium and platinum segment.

Alternatively, connections between each of the spaced apart titanium and platinum segments can be obtained by a plurality of aluminum connecting links rather than a sheet of aluminum which in effect covers all portions of the surface of the wafer not occupied by titanium and platinum. In place of the mask 20 illustrated, a mask which is opaque except for transparent areas defining the desired pattern of the connecting links is employed to expose the photosensitive resistant material over the aluminum layer to ultraviolet light. The unexposed resistant material and the underlying aluminum are removed to leave a pattern of aluminum connecting links protected by non-conductive resistant material electrically connecting all titanium and platinum segments.

Figure 15:
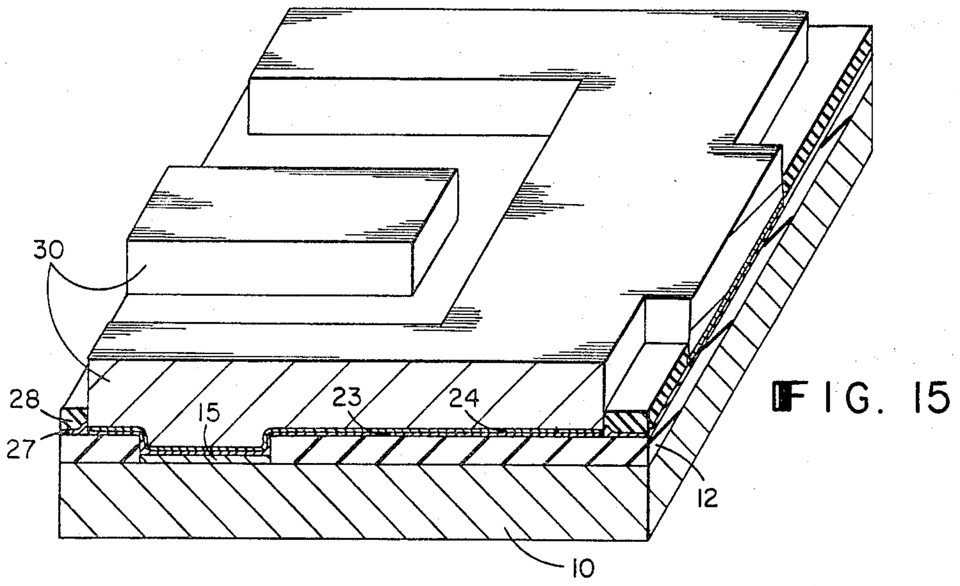

The assembly is immersed in a gold plating solution, for example, a standard gold cyanide plating bath. A cathode connection is made through the resistant material to the aluminum layer 27 near the edge of the wafer. The non-conductive resistant material 28 remains in place over the remainder of the aluminum layer and is not disturbed by the plating solution. Gold deposits only on the exposed conductive surface of the platinum layer. Electroplating is carried out under appropriate conditions of current flow and for a suitable time in accordance with the surface area of the platinum so as to produce gold members 30 approximately .2 to .3 mil thick overlying the titanium and platinum segments as shown in FIG. 15.

Following plating of the gold leads and suitable rinsing of the assembly, the resistant material 28 is removed by dissolving in a suitable solution. The assembly is then treated by spraying for about 2 minutes with a sodium hydroxide solution as employed previously. The aluminum is thus completely removed exposing the underlying silicon oxide layer 12 as illustrated in FIG. 16. Supporting leads having a thin layer of titanium 23, a thin layer of platinum 24, and a thick layer of gold 30 thus remain in the pattern determined by the opaque regions of the mask 20.

The nature of the titanium-platinum-gold combination is as known in supporting lead devices fabricated by prior art processes. The titanium provides good adherence between the leads and the oxide coating as well as between the leads and the platinum silicide. The platinum provides good adherence of the gold to the titanium. In addition, since the titanium is porous, without the platinum layer gold would tend to alloy with the silicon oxide underlying the titanium.

After formation of the supporting leads according to the method of the invention, the wafer is processed in accordance with known techniques to divide the wafer into individual integrated circuit networks. The entire upper surface of the wafer is masked with a suitable resistant material and the wafer is subjected to an etching solution which dissolves silicon from the undersurface of the wafer to reduce the silicon wafer to a thickness of about 2 mils. The undersurface of the wafer is then suitably masked and subjected to sand blasting to form grooves in the wafer encircling regions of the wafer which are to be separated into individual bodies of silicon. When the thickness of the silicon in the grooves is approximately ½ mil, sand blasting is discontinued and the masked wafer is subjected to an etching solution to remove the final ½ mil of silicon.

The wafer is thus separated into a plurality of identical integrated circuit networks, each network having a plurality of individual isolated bodies 10 of silicon held together by the supporting leads 30. A single integrated circuit network is illustrated in FIG. 17, the dashed lines labeled "A" indicating the section which is shown at various stages of the process of the invention in FIGS. 1B through 16. The portions of the leads 30 extending outwardly from the silicon bodies serve as external contacts to the circuit. They may be directly connected, as by welding, to an array of leads or other conductive members in the enclosure in which the circuit network is mounted.

The method of the invention thus provides a technique for fabricating supporting leads on semiconductor devices in which the various processing steps and the materials employed are compatible. The process is a combination of individually well established techniques of photosensitive resist masking, etching, and depositing materials by sputtering, evaporating, and electroplating. After a material constituting a portion of the leads in their final form is added to the assembly, the assembly is not subjected to a material or process having a deleterious effect on that material. Thus, the resulting leads are well defined, uniform, have good physical characteristics, and are strongly adherent to the bodies of semiconductor material.

While there has been shown and described what is considered a preferred embodiment of the present invention, it will be obvious to those skilled in the art that various changes and modifications may be made therein without departing from the invention as defined in the appended claims.

What is claimed is:

1. The method of forming connecting leads to a body of semiconductor material having a surface coated with an adherent layer of a non-conductive material interspersed with conductive contacts in ohmic connection with underlying portions of said body including the steps of placing a first temporary layer of material on predetermined portions of the surface of the layer of non-conductive material leaving exposed other portions of the surface of the layer of non-conductive material and at least portions of the conductive contacts, said exposed portions delineating areas on which the connecting leads are to be formed, placing conductive material on said exposed portions of the surface of the layer of non-conductive material and the conductive contacts and on the first temporary layer of material, subjecting the assembly to etching material capable of dissolving the material of the first temporary layer but not the other materials of the assembly to remove the first temporary layer and the overlying conductive material whereby conductive material remains on portions of the surface of the layer of non-conductive material and the conductive contacts, placing a layer of a second conductive material and an overlying non-conductive masking coating on regions of the surface of the layer of non-conductive material to cause the conductive material on each of the portions of the surface of the layer of non-conductive material and the conductive contacts to be electrically connected to the conductive material on every one of the other portions, electroplating a conductive material onto the exposed conductive material to provide conductive members overlying the portions of the surface of the layer of non-conductive material and the conductive contacts, removing said overlying non-conductive masking coating, and subjecting the assembly to etching material capable of dissolving said second conductive material but not the other materials of the assembly to remove the second conductive material.

2. The method of forming connecting leads to a body of semiconductor material according to claim 1 in which said first temporary layer includes a film of a first temporary material adherent to the surface of the layer of non-conductive material and a layer of a second temporary material adherent to said film.

3. The method of forming connecting leads to a body of semiconductor material according to claim 1 in which said first temporary layer includes a film of a first temporary material adherent to the surface of the layer of non-conductive material and a layer of a second temporary material adherent to said film; and the step of subjecting the assembly to etching material capable of dissolving the material of the first temporary layer is performed in two stages by subjecting the assembly to a first etching solution capable of dissolving the second temporary material of the first temporary layer but not the first temporary material to remove the second temporary material of the first temporary layer and the overlying conductive material whereby conductive material remains on portions of the surface of the layer of non-conductive material and the conductive contacts, and the film of the first temporary material remains on said predetermined portions of the surface of the layer of non-conductive material, and subjecting the assembly to a second etching solution capable of dissolving the first temporary material of the first temporary layer but not the second temporary material to remove the film of the first temporary material.

4. The method of forming connecting leads to a body of semiconductor material having a surface coated with an adherent layer of a non-conductive material interspersed with conductive contacts in ohmic connection with underlying portions of said body including the steps of depositing material to form a first temporary layer over the entire surface of the layer of non-conductive material and the conductive contacts, placing a masking material on predetermined portions of the first temporary layer overlying predetermined portions of the layer of non-conductive material and leaving exposed other portions of the first temporary layer overlying other portions of the layer of non-conductive material and at least portions of the conductive contacts delineating areas on which connecting leads are to be formed, subjecting the assembly to etching material capable of dissolving the material of the first temporary layer but not the other materials of the assembly to remove the exposed portions of the first layer and expose the underlying portions of the layer of non-conductive material and the conductive contacts, removing the masking material, depositing conductive material on the exposed portions of the layer of non-conductive material and the conductive contacts and on the remainder of the first temporary layer, subjecting the assembly to etching material capable of dissolving the material of the first temporary layer but not the other materials of the assembly to remove the exposed portions of the first layer and expose the underlying portions of the layer of non-conductive material and the conductive contacts, removing the masking material, depositing conductive material on the exposed portions of the layer of non-conductive material and the conductive contacts and on the remainder of the first temporary layer, subjecting the assembly to etching material capable of dissolving the material of the first temporary layer but not the other materials of the assembly to remove the remainder of the first temporary layer and the overlying conductive material whereby segments of the conductive material remain on portions of the layer of non-conductive material and the conductive contacts, depositing a second conductive material to form a second layer on said segments and said predetermined portions of the layer of non-conductive material, placing a non-conductive masking material on regions of the second layer which extend between said segments to provide a continuous path of segments and regions of the second layer underlying the non-conductive masking material, subjecting the assembly to etching material capable of dissolving the material of the second layer but not the other materials of the assembly to remove the exposed portions of the second layer and expose said segments, each of said segments being electrically connected to every other segment by the continuous path of segments and regions of the second layer underlying the non-conductive masking material, electroplating a conductive material onto the assembly whereby conductive material deposits on said segments to form conductive leads overlying portions of the layer of non-conductive material and the conductive contacts, removing the non-conductive masking material, and subjecting the assembly to an etching medium capable of dissolving the material of the second layer but not the other materials of the assembly to remove the remainder of the second layer.

5. The method of forming connecting leads to a body of semiconductor material according to claim 4 in which said first temporary layer includes a film of a first temporary material adherent to the surface of the layer of non-conductive material and the conductive contacts and a layer of a second temporary material adherent to said film.

6. The method of forming connecting leads to a body of semiconductor material according to claim 4 in which said first temporary layer includes a film of a first temporary material adherent to the surface of the layer of non-conductive material and the conductive contacts and a layer of second temporary material adherent to said film;

the step of subjecting the assembly to etching material capable of dissolving the material of the first temporary layer but not the other materials of the assembly to remove the exposed portions of the first layer and expose the underlying portions of the layer of non-conductive material and the conductive contacts is performed in two stages by subjecting the assembly to a first etching solution capable of dissolving the second temporary material of the first temporary layer but not the first temporary material to remove the exposed portions of the second temporary material and expose portions of the film of the first temporary material, and subjecting the assembly to a second etching solution capable of dissolving the first temporary material of the first temporary layer but not the second temporary material to remove the exposed portions of the film of the first temporary material and expose the underlying portions of the layer of non-conductive material and the conductive contacts; and in which the step of subjecting the assembly to etching material capable of dissolving the material of the first temporary layer but not the other materials of the assembly to remove the remainder of the first temporary layer and the overlying conductive material whereby segments of the conductive material remain on portions of the layer of non-conductive material and the conductive contacts is performed in two stages by subjecting the assembly to a first etching solution capable of dissolving the second temporary material of the first temporary layer but not the first temporary material to remove the remainder of the second temporary material and the overlying conductive material and expose the remainder of the film of the first temporary material, and subjecting the assembly to a second etching solution capable of dissolving the first temporary material of the first temporary layer but not the second temporary material to remove the remainder of the film of the first temporary material.

7. The method of producing semiconductor devices having conecting leads attached thereto including the steps of providing a body of semiconductor material having a surface coated with an adherent non-conductive coating having openings therein exposing surface areas of said body, establishing conductive contacts at the exposed surface areas in ohmic contact with the semiconductor material at the exposed surface areas, depositing copper to form a layer of copper over the entire surface of the non-conductive coating and the conductive contacts, placing a masking material on predetermined portions of the layer of copper overlying predetermined portions of the non-conductive coating and leaving exposed other portions of the layer of copper overlying other portions of the nonconductive coating and at least portions of the conductive contacts delineating areas on which connecting leads are to be formed, subjecting the assembly to an etching medium capable of dissolving copper but not the other materials of the assembly to remove the exposed portions of the layer of copper and expose the underlying portions of the non-conductive coating and the conductive contacts, removing the masking material, depositing a layer of titanium on the exposed portions of the non-conductive coating and the conductive contacts and on the remainder of the layer of copper, depositing a layer of platinum on the layer of titanium, the total thickness of the layers of titanium and platinum being less than the thickness of the layer of copper, subjecting the assembly to an etching medium capable of dissolving copper but not the other materials of the assembly to remove the copper and the overlying titanium and platinum whereby segments of titanium and platinum remain on portions of the non-conductive coating and the conductive contacts, depositing aluminum to form a layer of aluminum over the entire surface of said segments and said predetermined portions of the non-conductive coating, placing non-conductive masking material on predetermined portions of the layer of aluminum generally overlying said predetermined portions of the non-conductive coating, subjecting the assembly to an etching medium capable of dissolving alumium but not the other materials of the assembly to remove the exposed portions of the layer of aluminum and expose said segments, each of said segments being electrically connected to every other segment by the remainder of the layer of aluminum and the segments, electroplating the assembly in a gold plating solution whereby gold deposits on said segments to form conductive leads overlying portions of the surface of the non-conductive coating and the conductive contacts, removing the non-conductive masking material, and subjecting the assembly to an etching medium capable of dissolving aluminum but not the other materials of the assembly to remove the remainder of the layer of alumnium.

8. The method of producing semiconductor devices having connecting leads attached thereto including the steps of providing a body of semiconductor material having a surface coated with an adherent non-conductive coating having openings therein exposing surface areas of said body, establishing conductive contacts at the exposed surface areas in ohmic contact with the semiconductor material at the exposed surface areas, depositing aluminum to form a film of aluminum over the entire surface of the non-conductive coating and the conductive contacts, depositing copper to form a layer of copper over the entire surface of the film of aluminum, placing a masking material on predetermined portions of the layer of copper overlying predetermined portions of the non-conductive coating and leaving exposed other portions of the layer of copper overlying other portions of the non-conductive coating and at least portions of the conductive contacts delineating areas on which connecting leads are to be formed, subjecting the assembly to an etching medium capable of dissolving copper but not the other materials of the assembly to remove the exposed portions of the layer of copper and expose portions of the film of aluminum overlying portions of the non-conductive coating and the conductive contacts, removing the masking material, subjecting the assembly to an etching medium capable of dissolving aluminum but not the other materials of the assembly to remove the exposed portions of the film of aluminum and expose the underlying portions of the non-conductive coating and the conductive contacts, depositing a layer of titanium on the exposed portions of the non-conductive coating and the conductive contacts and on the remainder of the layer of copper, depositing a layer of platinum on the layer of titanium, the total thickness of the layers of titanium and platinum being less than the total thickness of the film of aluminum and the layer of copper, subjecting the assembly to an etching medium capable of dissolving copper but not the other materials of the assembly to remove the remainder of the layer of copper and undermine the overlying titanium and platinum whereby segments of titanium and platinum remain on portions of the non-conductive coating and the conductive contacts, subjecting the assembly to an etching medium capable of dissolving aluminum but not the other materials of the assembly to remove the remainder of the layer of aluminum, depositing aluminum to form a layer of aluminum over the entire surface of said segments and said predetermined portions of the non-conductive coating, placing non-conductive masking material on predetermined portions of the layer of aluminum generally overlying said predetermined portions of the non-conductive coating, subjecting the assembly to an etching medium capable of dissolving aluminum but not the other materials of the assembly to remove the exposed portions of the layer of aluminum and expose said segments, each of said segments being electrically connected to every other segment by the remainder of the layer of aluminum and the segments, electroplating the assembly in a gold plating solution whereby gold deposits on said segments to form conductive leads overlying portions of the surface of the non-conductive coating and the conductive contacts, removing the non-conductive masking material, and subjecting the assembly to an etching medium capable of dissolving aluminum but not the other materials of the assembly to remove the remainder of the layer of aluminum.

References Cited

UNITED STATES PATENTS

| | | | |
|---|---|---|---|
| 2,834,723 | 5/1958 | Robinson | 204—15 |
| 2,943,956 | 7/1960 | Robinson | 204—15 |
| 3,208,921 | 9/1965 | Hill | 204—15 |
| 3,311,546 | 3/1967 | Berry et al. | 204—15 |

JOHN H. MACK, *Primary Examiner.*

T. TUFARIELLO, *Assistant Examiner.*

U.S. Cl. X.R.

156—3, 17

UNITED STATES PATENT OFFICE
CERTIFICATE OF CORRECTION

Patent No. 3,421,985 January 14, 1969

Allen G. Baker et al.

It is certified that error appears in the above identified patent and that said Letters Patent are hereby corrected as shown below:

Column 8, line 67, beginning with "subjecting the assembly" cancel all to and including "temporary layer," in column 9, line 2.

Signed and sealed this 17th day of March 1970.

(SEAL)
Attest:

Edward M. Fletcher, Jr.
Attesting Officer

WILLIAM E. SCHUYLER, JR.
Commissioner of Patents